(12) United States Patent
Seely et al.

(10) Patent No.: US 11,107,169 B2
(45) Date of Patent: Aug. 31, 2021

(54) SYSTEMS AND METHODS FOR CONTROLLING AND MONITORING POWER ASSETS

(71) Applicant: General Electric Company, Schenectady, NY (US)

(72) Inventors: William Forrester Seely, Taylors, SC (US); Frederick William Block, Campobello, SC (US); John Joseph Raffensperger, Simpsonville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 674 days.

(21) Appl. No.: 14/944,494

(22) Filed: Nov. 18, 2015

(65) Prior Publication Data
US 2017/0140480 A1    May 18, 2017

(51) Int. Cl.
*G06Q 50/06*    (2012.01)
*H02J 15/00*    (2006.01)
(Continued)

(52) U.S. Cl.
CPC ............ *G06Q 50/06* (2013.01); *G06Q 10/06* (2013.01); *H02J 3/386* (2013.01); *H02J 15/00* (2013.01);
(Continued)

(58) Field of Classification Search
CPC ........ Y04S 40/22; G06Q 50/06; G06Q 10/00; H02J 3/386; H02J 2003/007; Y02E 10/763; Y02E 60/76
See application file for complete search history.

(56) References Cited

U.S. PATENT DOCUMENTS 6,975,925 B1 * 12/2005 Barnes ................... F03D 7/048
                                                                700/286
7,002,260 B2    2/2006 Stahlkopf
(Continued)

FOREIGN PATENT DOCUMENTS

CN        104272200 A      1/2015
JP        2004312797 A    11/2004
(Continued)

OTHER PUBLICATIONS

Mills, Stephen: "Integrating intermittent renewable energy technologies with coal-fired power plant"; Oct. 2011; IEA Clean Coal Centre; retrieved from https://usea.org/sites/default/files/102011_Integrating%20intermittent%20renewable%20energy%20technologies%20with%20coal-fired%20power%20plant_ccc189.pdf (Year: 2011).*
(Continued)

*Primary Examiner* — Shannon S Campbell
*Assistant Examiner* — Bryan J Kirk
(74) *Attorney, Agent, or Firm* — Armstrong Teasdale LLP

(57) ABSTRACT

A system for managing multiple power assets is provided. The system includes at least one volatile asset, at least one deterministic asset, and a controller communicatively coupled to the at least one volatile asset and the at least one deterministic asset, the controller configured to receive data from said at least one volatile asset, predict a change in power output for said at least one volatile asset based on the received data, and control operation of said at least one deterministic asset to compensate for the predicted change in power output.

20 Claims, 6 Drawing Sheets

(51) Int. Cl.
*H02J 3/38* (2006.01)
*G06Q 10/06* (2012.01)

(52) U.S. Cl.
CPC .......... *H02J 2203/20* (2020.01); *Y02E 10/76* (2013.01); *Y02E 70/30* (2013.01)

(56) References Cited

U.S. PATENT DOCUMENTS

| | | |
|---|---|---|
| 8,076,789 B2 | 12/2011 | Miller |
| 8,105,029 B2 | 1/2012 | Egedal et al. |
| 8,295,989 B2 | 10/2012 | Rettger et al. |
| 9,097,236 B2 | 8/2015 | Zhou et al. |
| 2003/0160457 A1 | 8/2003 | Ragwitz et al. |
| 2008/0195255 A1* | 8/2008 | Lutze .................. F03D 7/0284 700/291 |
| 2009/0292402 A1* | 11/2009 | Cruickshank, III ... G06Q 10/00 700/287 |
| 2010/0198420 A1 | 8/2010 | Rettger et al. |
| 2010/0231045 A1* | 9/2010 | Collins .................... H02J 3/28 307/47 |
| 2012/0065803 A1 | 3/2012 | Teichmann et al. |
| 2012/0101644 A1* | 4/2012 | Evans .................. G05B 13/026 700/287 |
| 2012/0143565 A1 | 6/2012 | Graham, III et al. |
| 2013/0274898 A1* | 10/2013 | Thatikonda ........ G05B 23/0224 700/44 |
| 2016/0072291 A1* | 3/2016 | Goldman .................. H02J 3/32 700/295 |

FOREIGN PATENT DOCUMENTS

| | | | |
|---|---|---|---|
| JP | 2007037226 A | 2/2007 | |
| JP | 2008140109 A | 6/2008 | |
| JP | 2008289222 A | 11/2008 | |
| JP | 2014103704 A | 6/2014 | |
| JP | 2015061511 A | 3/2015 | |
| WO | WO-2017045698 A1 * | 3/2017 | ............. H02J 3/386 |

OTHER PUBLICATIONS

Mills, Stephen ("Integrating intermittent renewable energy technologies with coal-fired power plant"; 2011; IEA Clean Coal Centre; retrieved from https://usea.org/sites/default/files/102011_Integrating%20intermittent%20renewable%20energy%20technologies%20with%20coal-fired%20power%20plant_ccc189.pdf (Year: 2011).*

Extended European Search Report and Opinion issued in connection with corresponding EP Application No. 16199230.0 dated Apr. 21, 2017.

CN Supplementary Search for CN Patent Application 2016110159066 dated Apr. 23, 2021; 1 page.

JP Notice of Reasons for Refusal for JP Patent Application 2016-221094 dated Jun. 16, 2021; 11 pp.

* cited by examiner

SYSTEMS AND METHODS FOR CONTROLLING AND MONITORING POWER ASSETS

BACKGROUND

The field of the disclosure relates generally to power generation, and more particularly to generating stable power output from a plurality of assets and monitoring operation of those assets.

At least some known gas turbine engines include at least one compressor, a combustor, and a high-pressure turbine coupled together in a serial flow relationship. More specifically, the compressor and high-pressure turbine are coupled through a shaft to form a high-pressure rotor assembly. Air entering the turbine engine is mixed with fuel and ignited to form a high energy gas stream. The high energy gas stream flows through the high-pressure turbine to rotatably drive the high-pressure turbine such that the shaft rotatably drives the compressor and an electrical generator. Once the air leaves the high-pressure turbine, it typically enters a heat recovery steam generator (HRSG) that uses a large portion of the remaining thermal energy to boil and superheat water into steam used to drive a steam turbine for increased electrical power outputs. Gas turbine engines provide a relatively stable power output.

However, renewable power generation assets (e.g., wind turbines, solar power systems, etc.) are becoming increasingly prevalent, leading to indeterminate volatility in power output. Increasing use of volatile assets will likely continue, leading to power grids that are more susceptible to fluctuations in uncontrolled parameters, such as the weather.

Further, both stable and volatile power generation assets may require substantially constant monitoring to avoid potential problems and issues. In addition, some issues may not be detectable at an individual component level, but may only arise when a certain sequence of events occurs, or a certain combination of states is reached. Detecting such failures may be difficult for human operators, and may be nearly impossible for real-time controllers and systems due to limited historical data, limited computational resources, and fixed logic. At least some known computing systems are not able to retain and process the vast amounts of historical data required to detect patterns of failures related to current operation of a power asset. As systems become increasingly complex, it becomes even more difficult for human operators to predict impending failures.

BRIEF DESCRIPTION

In one aspect, a system for managing multiple power assets is provided. The system includes at least one volatile asset, at least one deterministic asset, and a controller communicatively coupled to the at least one volatile asset and the at least one deterministic asset, the controller configured to receive data from said at least one volatile asset, predict a change in power output for said at least one volatile asset based on the received data, and control operation of said at least one deterministic asset to compensate for the predicted change in power output.

In another aspect, a controller for managing multiple power assets is provided. The controller includes a memory device, and a processor communicatively coupled to the memory device, the processor configured to receive data from at least one volatile asset, predict a change in power output for the at least one volatile asset based on the received data, and control operation of at least one deterministic asset to compensate for the predicted change in power output.

In another aspect, a method for managing multiple power assets is provided. The method includes receiving, at a controller, data from at least one volatile asset, predicting, using the controller, a change in power output for the at least one volatile asset based on the received data, and controlling, using the controller, operation of at least one deterministic asset to compensate for the predicted change in power output.

DETAILED DESCRIPTION

The embodiments described herein facilitate managing multiple power assets is provided. A controller communicatively coupled to at least one volatile asset and at least one deterministic asset receives data from the at least one volatile asset, predicts a change in power output for the at least one volatile asset, and controls operation of the at least one deterministic asset to compensate for the predicted change in power output. Further, to facilitate monitoring operation of a particular power asset, the controller may collect operating data for the power asset, determine an operating mode of the power asset, analyze historical data to determine an average state for assets previously operating in the operating mode, analyze the historical data to identify a problem run for an asset previously operating in the operating mode, and cause the operating data, determined average state, and identified problem run to be displayed to a human operator.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

Figure 1:
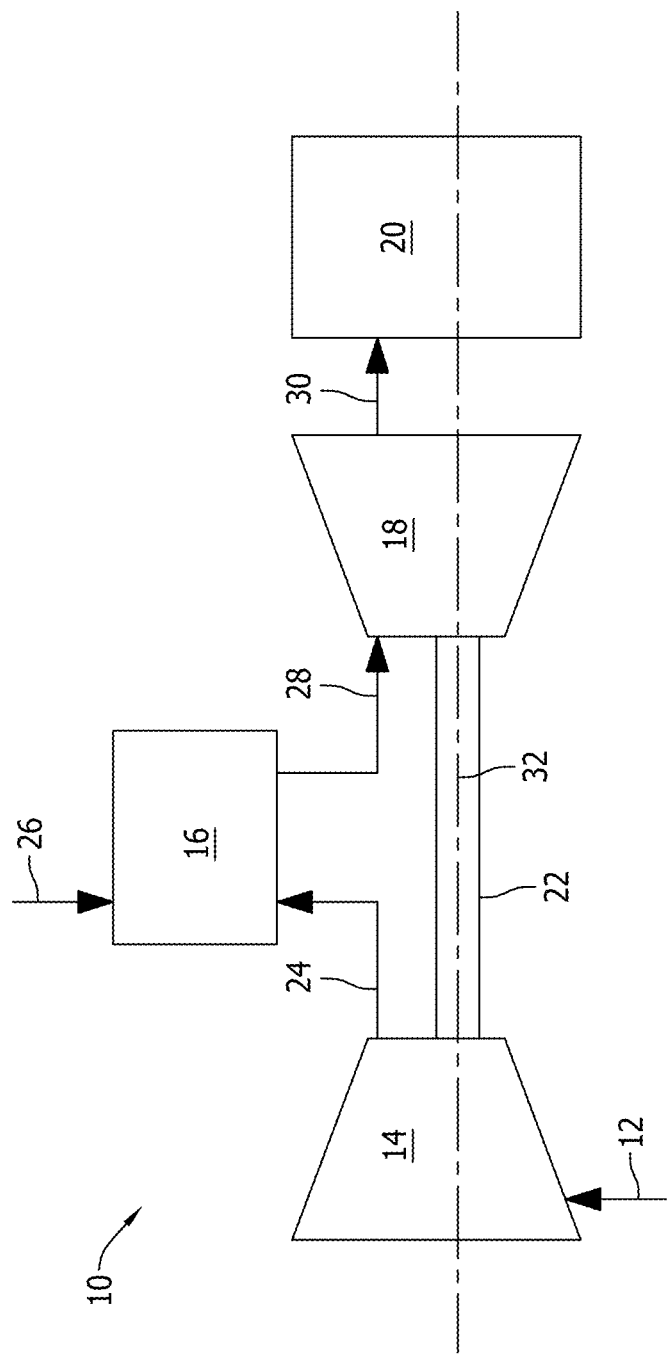
FIG. 1 is a schematic diagram of an exemplary embodiment of a gas turbine.

FIG. 1 is a schematic diagram of an exemplary turbine engine 10 with which embodiments of the current disclosure may be used. In the exemplary embodiment, turbine engine 10 is a gas turbine that includes a compressor section 14, a combustor section 16 coupled downstream from compressor section 14, a turbine section 18 coupled downstream from combustor section 16, and an exhaust section 20 coupled downstream from turbine section 18.

In the exemplary embodiment, turbine section 18 is coupled to compressor section 14 via a rotor shaft 22. It should be noted that, as used herein, the term "couple" is not limited to a direct mechanical, electrical, and/or communication connection between components, but may also include an indirect mechanical, electrical, and/or communication connection between multiple components. Rotor shaft 22 defines a centerline axis 32 of gas turbine 10. Unless otherwise stated, the term "axially" refers to a direction parallel to centerline axis 32, and the term "radially" refers to a direction radially outward from centerline axis 32.

During operation of gas turbine 10, compressor section 14 receives an air flow 12. Compressor section 14 converts mechanical rotational energy from rotor shaft 22 to compress air flow 12 to a higher pressure and temperature. Compressor section 14 discharges a flow of compressed air 24 to combustor section 16. In combustor section 16, compressed air 24 is mixed with a flow of fuel 26 and ignited to generate combustion gases 28 that are channeled towards turbine section 18. Turbine section 18 converts thermal energy from combustion gases 28 to mechanical rotational energy of rotor shaft 22. Rotor shaft 22 may be coupled to a load (not shown) such as, but not limited to, an electrical generator and/or a mechanical drive application. Turbine section 18 emits a flow of exhausted combustion gases 30 downstream into exhaust section 20.

The systems and methods described herein facilitate using one or more relatively deterministic power generating devices, such as turbine engine 10, to compensate for changes in output power of a relatively volatile power generating device (e.g., a wind turbine). An integrated control system controls multiple assets that include both deterministic, or non-volatile assets (e.g., gas turbines, steam turbines, boilers, etc.) and volatile assets (e.g., wind turbines, solar panels, etc.). The control system coordinates between the non-volatile and volatile assets by communicating information (e.g., measurements, predictions, models) between assets to facilitate maintaining a desired power output without fluctuations that would normally occur from individually controlled assets.

Further, the systems and methods described herein facilitate monitoring operation of a power plant and/or power asset by comparing current operating conditions with historical conditions. Based on the comparisons, future outcomes may be predicted and communicated to a human operator. Potential problems may be flagged, enabling the operator to take appropriate corrective action based on the identified causes of the problems.

Figure 2:
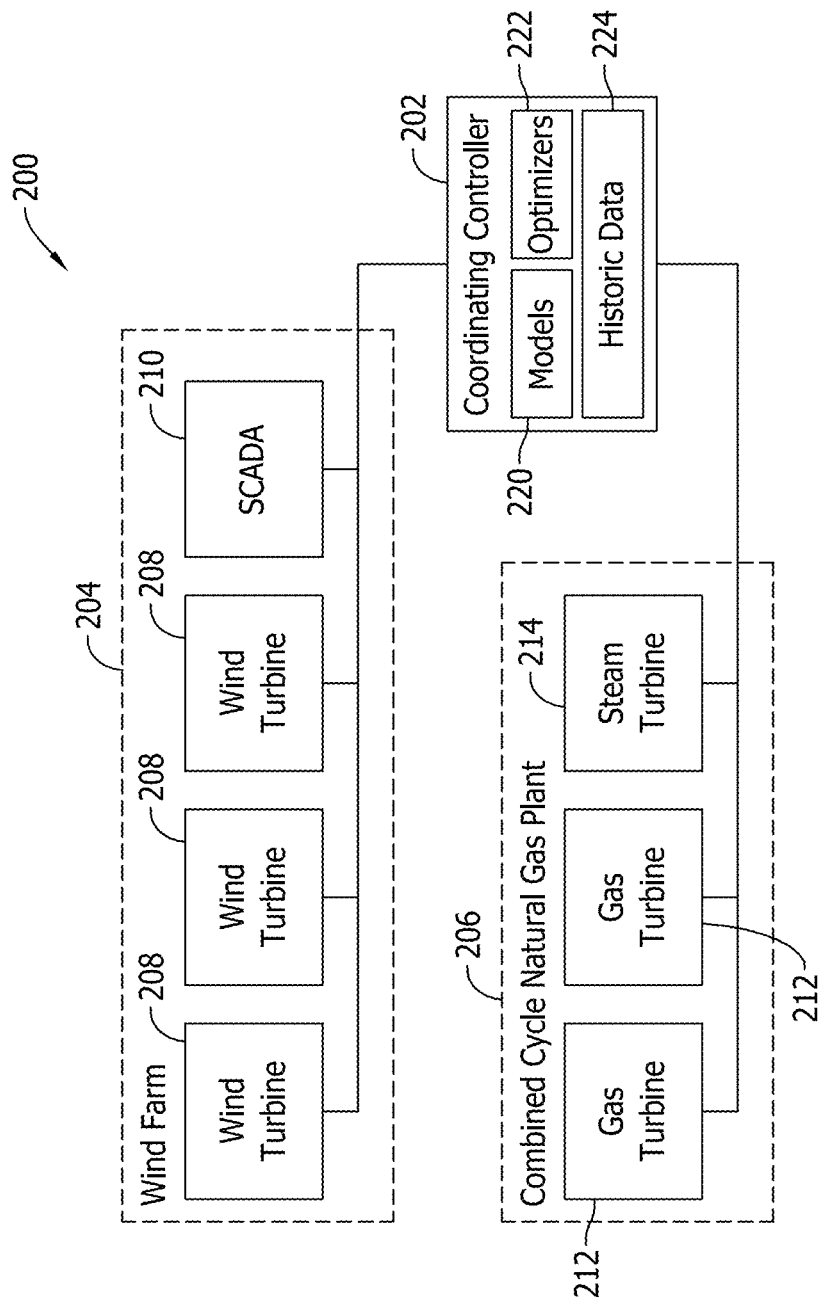
FIG. 2 is a block diagram of an exemplary control system for managing multiple power assets.

FIG. 2 is a block diagram of an exemplary control system 200 for managing multiple power assets. System 200 includes a controller 202 that coordinates between deterministic assets and volatile assets. In the exemplary embodiment, controller 202 is communicatively coupled to a wind farm 204 and a combined cycle natural gas plant 206. Alternatively, controller 202 may be communicatively coupled to any type of power plant that enables system 200 to function as described herein.

Wind farm 204 includes a plurality of wind turbines 208 and a supervisory control and data acquisition (SCADA) system 210. Combined cycle natural gas plant 206 includes a plurality of gas turbines 212 and a steam turbine 214. Gas turbines 212 and steam turbine 214 are examples of deterministic assets, and wind turbines 208 are examples of volatile assets. As used herein, deterministic assets are assets whose power generation generally relies on controlled factors, while volatile assets are assets whose power generation generally relies on uncontrolled factors. That is, the power output of deterministic assets is relatively stable, while the power output of volatile assets may fluctuate substantially (e.g., based on wind speed, available sunlight, etc.). Deterministic assets may include, for example, nuclear power plants and fossil fuel burning plants, while volatile assets may include renewable resource plants.

Controller 202 acquires data from wind farm 204 and combined cycle natural gas plant 206. In the example embodiment, a subset of deterministic assets (e.g., gas turbines 212), are put into a control mode by controller 202 such that they follow volatile assets (e.g., wind turbines 208) to facilitate ensuring that an overall combined power output is equal to a predetermined desired output. This ensures the overall combined power output does not float or vary based on uncontrollable factors (e.g., weather). The subset of deterministic assets may be determined, for example, by assets that have the fastest response time.

In the exemplary embodiment, controller 202 receives data from volatile assets (e.g., wind turbines 208) and controls the subset of stable, deterministic assets (e.g., gas turbines 212) to neutralize the volatility of the volatile assets. Controller 202 may also receive data from deterministic assets that are not in the subset. To accomplish this coordinated control, as shown in FIG. 2, controller 202 includes models 220 of assets and/or plants, one or more optimization algorithms 222, and historic data 224. Historic data 224 may include, for example, weather patterns and/or grid demand patterns that enable controller 202 to make predictions about power fluctuations that will occur in the future.

How far ahead controller 202 predicts power fluctuations depends, at least in part, on the type of deterministic asset to be controlled. For example, a relatively slow asset, such as a nuclear power plant, will generally require a few hours of notice. In contrast, a relatively fast asset, such as a gas turbine, may only require a few minutes of notice. Accordingly, to offset changes in power output of a volatile assets, the type of deterministic asset (e.g., nuclear power plant, gas turbine, etc.) may be chosen based on ramp rate (i.e., the rate at which the deterministic asset is able to scale up and down the amount of power provided).

In the exemplary embodiment, shown in FIG. 2, controller 202 coordinates operation between wind farm 204 and combined cycle natural gas plant 206. Specifically, wind farm 204 reports information to controller 202 that includes a location of each wind turbine 208, the current power output of each wind turbine 208, and a currently measured wind speed at each wind turbine 208. Controller 202 uses the reported information in conjunction with models 220, optimization algorithms 222, and historic data 224 (e.g., historic weather data, historic site data, etc.) to generate a prediction. For example, controller 202 may predict that a wind front will reach wind farm 204, causing a spike in power generated by wind farm 204. Controller 202 models the expected increase in power while facilitating maintaining optimal performance. Based on the expected increase in power, controller 202 instructs combined cycle natural gas plant 206 to unload each deterministic asset by the appropriate amount of power.

During operation of a power plant, such as combined cycle natural gas plant 206, there are multiple scenarios that may lead to failure of a system, a gas turbine, or the entire plant. Such scenarios may be relatively complex. For example, a sequence of events or combination of certain conditions may lead to failures, even though each individual event or condition by itself is not necessarily indicative of pending failure. Predicting such failures may be difficult for human operators, as it requires a great deal of experience to identify failure patterns. Further, real-time controllers and systems may have great difficulty in predicting pending problems.

Figure 3:
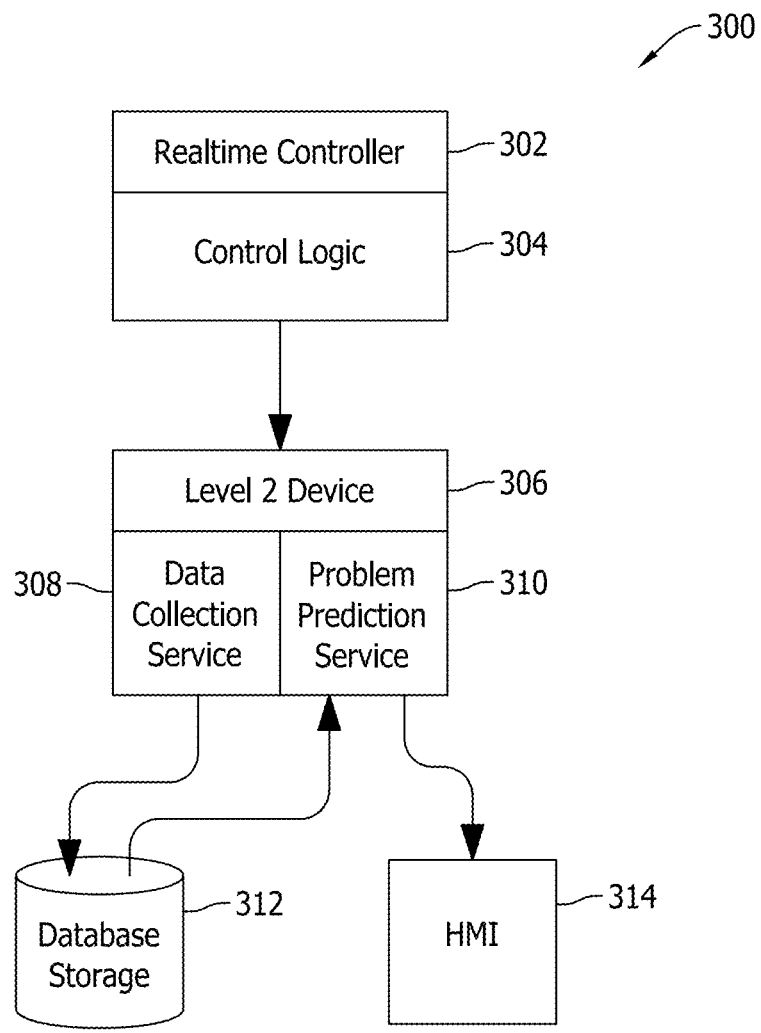
FIG. 3 is a schematic diagram of an exemplary system for predicating failures in a power generation system.

FIG. 3 is a schematic diagram of an exemplary system 300 for predicting failures in a power generation system (e.g., gas turbine). System 300 includes a real-time controller 302 that operates based on control logic 304. Real-time controller 302 controls an asset (e.g., wind turbine 208 or gas turbine 212), and sends data associated with the asset to second level device 306. In the exemplary embodiment, second level device 306 performs a data collection service 308 and a problem prediction service 310. For data collection service 308, second level device 306 collects operating data from a power asset, such as a gas turbine, and stores the collected operating data in a database 312. For problem prediction service 310, second level device 306 compares current operating data with historical operating data retrieved from database 312. The results of the comparison may be output to a human machine interface (HMI) 314 (e.g., a display device).

Figure 4:
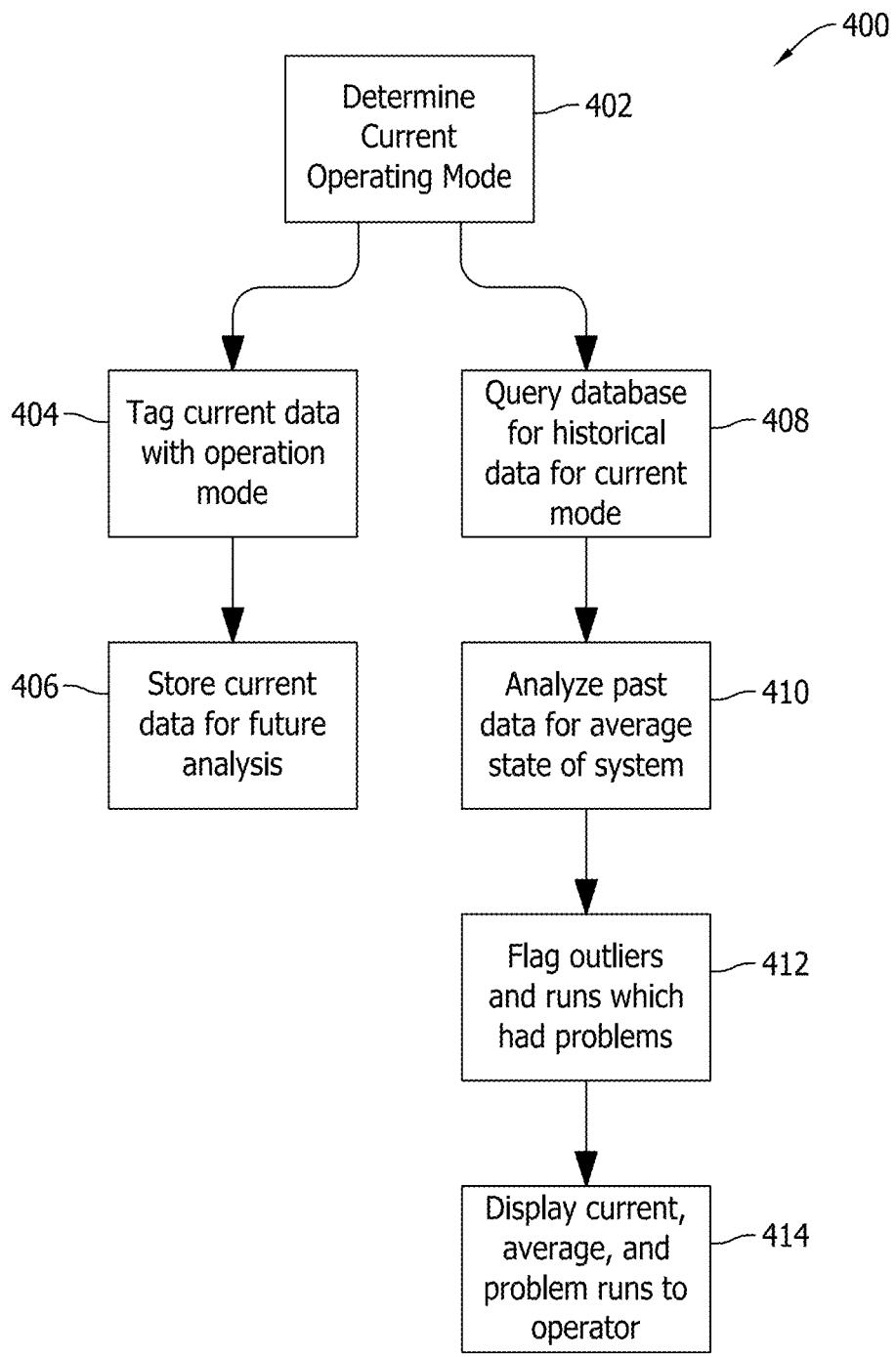
FIG. 4 is a flow diagram of a method for performing a data collection service and a problem prediction service using the system shown in FIG. 3.

FIG. 4 is a flow diagram of a method 400 for performing data collection service 308 and problem prediction service 310 (shown in FIG. 3). Method 400 may be performed, for example, by second level device 306 (shown in FIG. 3).

At block 402, a current operating mode of a power generating asset (e.g., a gas turbine) is determined. To perform data collection service 308, at block 404, current operating data is tagged with the determined current operating mode. At block 406, the tagged data is stored for future analysis in a database (e.g., database 312 (shown in FIG. 3)).

To perform problem prediction service 310, at block 408, the database is queried for historical data corresponding to the current operating mode. At block 410, the historical data is analyzed to determine an average state of the power generating asset when operating in the current operating mode. At block 412, the historical data is further analyzed to identify and flag outliers or runs in the historical data that had problems or failures. At block 414, the current operating data, the average state determined at block 410, and any problem outliers or runs flagged at block 412 are displayed. This information may be displayed, for example, on HMI 314 (shown in FIG. 3).

Figure 5:
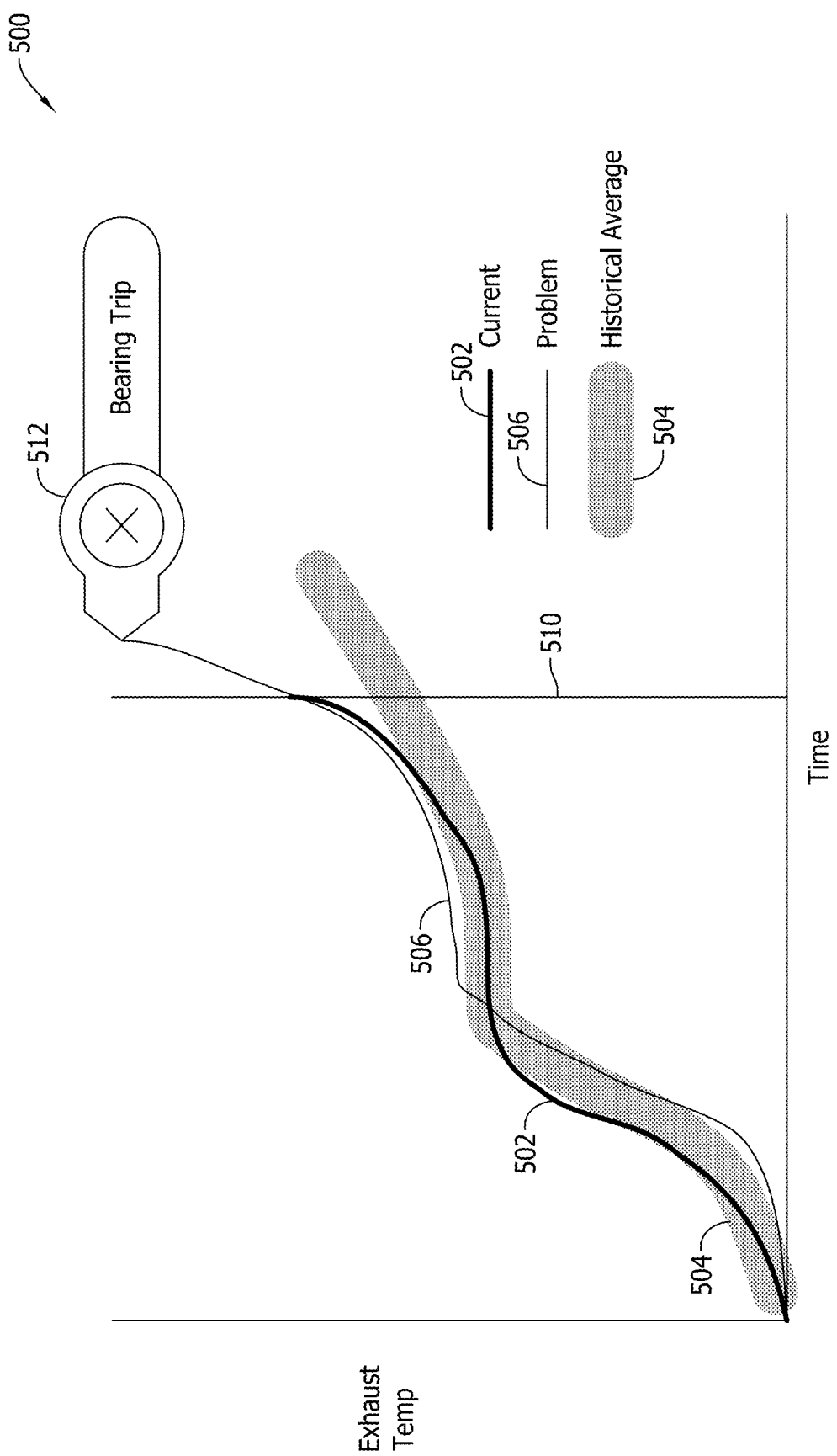
FIG. 5 is an exemplary display that may be generated using the system shown in FIG. 3.

FIG. 5 is an exemplary display 500 that may be generated at block 414 (shown in FIG. 4). As shown in FIG. 5, in the exemplary embodiment, display 500 plots exhaust temperature over time for the particular power generation asset being monitored. Alternatively, display 500 may display any type of plot or data that facilitates monitoring operation of the power generation asset, as described herein. Display 500 includes a current operating data curve 502, an average state curve 504, and a problem curve 506. Notably, current operating data curve 502 ends at a current time 510. Display 500 also includes a failure indicator 512 that indicates the failure that occurred (i.e., a bearing tip failure) as a result of problem curve 506.

Notably, upon viewing display 500, a human operator can quickly and easily determine whether operation of the power generation asset is likely to result in a failure. For example, in FIG. 5, current operating data curve 502 diverts from average state curve 504, but tracks problem curve 506. This indicates that a bearing tip failure is likely imminent if the power generation asset continues to operate without adjustment from the human operator. Upon observing display 500, the human operator can take appropriate action (e.g., performing diagnostics, maintenance, or part replacement) to avoid the likely impending failure.

Accordingly, system 300 uses historical operation data that has been previously logged to analyze similar situations, in order to evaluate current operation of a power generation asset and power plant. System 300 also facilitates displayed expected paths of operation that lead to successful operation and failures. If there is an impending failure, it is shown to operators based on probabilistic situations from historical operation.

As such, system 300 combines real-time operational data with historical analysis to alert the operator of otherwise undetectable problems. System 300 also contains a learning aspect, as system 300 constantly collects new operational data on which to train the analysis. Data can be collected for power generation assets at a given site, or assets at multiple sites, leveraging large amounts of data to better predict and avoid problems.

System 300 also shows operators when operation is outside of a normal path. By knowing when a power plant or power generation asset is operating outside of a standard operation path (determined by historical data), operators can determine when maintenance is needed or when parts are beginning to deteriorate, taking action in real-time based on the output of system 300. Accordingly, displaying potential problem paths with relative probability of them occurring based on historical data provides significant value in avoiding costly downtime or damaged equipment.

Figure 6:
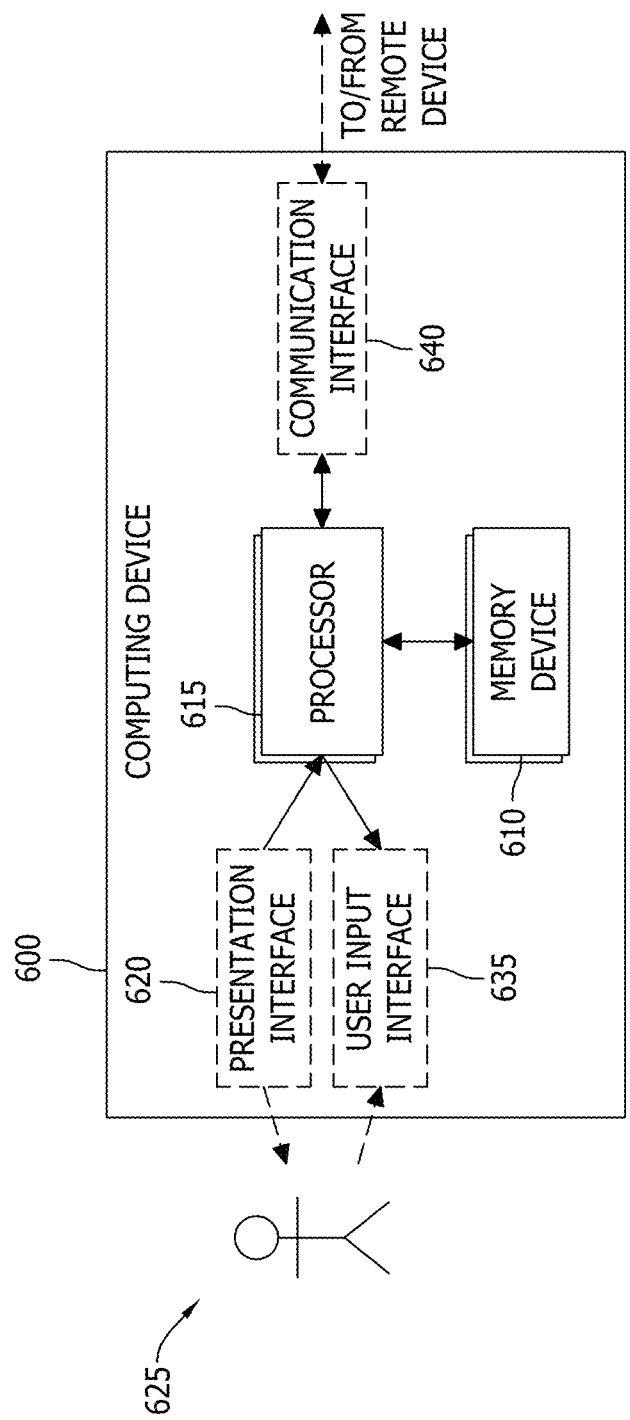
FIG. 6 is block diagram of an exemplary computing device that may be used with the systems shown in FIGS. 2 and 3.

FIG. 6 is a block diagram of a computing device 600 that may be used to implement the systems and methods described herein. For example computing device 600 may be used to implement controller 202 (shown in FIG. 2) and/or second level device 306 (shown in FIG. 3).

Computing device 600 includes at least one memory device 610 and a processor 615 that is coupled to memory device 610 for executing instructions. In some embodiments, executable instructions are stored in memory device 610. In the exemplary embodiment, computing device 600 performs one or more operations described herein by programming processor 615. For example, processor 615 may be programmed by encoding an operation as one or more executable instructions and by providing the executable instructions in memory device 610.

Processor 615 may include one or more processing units (e.g., in a multi-core configuration). Further, processor 615 may be implemented using one or more heterogeneous processor systems in which a main processor is present with secondary processors on a single chip. In another illustrative example, processor 615 may be a symmetric multi-processor system containing multiple processors of the same type. Further, processor 615 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein.

In the exemplary embodiment, memory device 610 is one or more devices that enable information such as executable instructions and/or other data to be stored and retrieved. Memory device 610 may include one or more computer readable media, such as, without limitation, dynamic random access memory (DRAM), static random access memory (SRAM), a solid state disk, and/or a hard disk. Memory device 610 may be configured to store, without limitation, application source code, application object code, source code portions of interest, object code portions of interest, configuration data, execution events and/or any other type of data.

In the exemplary embodiment, computing device 600 includes a presentation interface 620 (e.g., HMI 314 (shown in FIG. 3)) that is coupled to processor 615. Presentation interface 620 presents information to a user 625. For example, presentation interface 620 may include a display adapter (not shown) that may be coupled to a display device, such as a cathode ray tube (CRT), a liquid crystal display (LCD), an organic LED (OLED) display, and/or an "electronic ink" display. In some embodiments, presentation interface 620 includes one or more display devices. In the exemplary embodiment, display 500 is displayed on presentation interface 620 so that an operator can view display 500.

In the exemplary embodiment, computing device 600 includes a user input interface 635. User input interface 635 is coupled to processor 615 and receives input from user 625. User input interface 635 may include, for example, a keyboard, a pointing device, a mouse, a stylus, a touch sensitive panel (e.g., a touch pad or a touch screen), a gyroscope, an accelerometer, a position detector, and/or an audio user input interface. A single component, such as a touch screen, may function as both a display device of presentation interface 620 and user input interface 635.

Computing device 600, in the exemplary embodiment, includes a communication interface 640 coupled to processor 615. Communication interface 640 communicates with one or more remote devices. To communicate with remote devices, communication interface 640 may include, for example, a wired network adapter, a wireless network adapter, and/or a mobile telecommunications adapter.

The systems and methods described herein facilitate managing multiple power assets is provided. A controller communicatively coupled to at least one volatile asset and at least one deterministic asset receives data from the at least one volatile asset, predicts a change in power output for the at least one volatile asset, and controls operation of the at least one deterministic asset to compensate for the predicted change in power output. Further, to facilitate monitoring operation of a particular power asset, the controller may collect operating data for the power asset, determine an operating mode of the power asset, analyze historical data to determine an average state for assets previously operating in the operating mode, analyze the historical data to identify a problem run for an asset previously operating in the operating mode, and cause the operating data, determined average state, and identified problem run to be displayed to a human operator.

At least one technical effect of the systems and methods described herein includes (a) receiving data from at least one volatile asset; (b) predicting a change in power output for the at least one volatile asset based on the received data; and (c) controlling operation of at least one deterministic asset to compensate for the predicted change in power output.

The methods and systems described herein are not limited to the specific embodiments described herein. For example, components of each system and/or steps of each method may be used and/or practiced independently and separately from other components and/or steps described herein. In addition, each component and/or step may also be used and/or practiced with other assemblies and methods.

While the disclosure has been described in terms of various specific embodiments, those skilled in the art will recognize that the disclosure can be practiced with modification within the spirit and scope of the claims. Although specific features of various embodiments of the disclosure may be shown in some drawings and not in others, this is for convenience only. Moreover, references to "one embodiment" in the above description are not intended to be interpreted as excluding the existence of additional embodiments that also incorporate the recited features. In accordance with the principles of the disclosure, any feature of a drawing may be referenced and/or claimed in combination with any feature of any other drawing.

What is claimed is:

1. A system for managing multiple power assets, said system comprising:
    at least one volatile asset, the power generation capability of the at least one volatile asset is dependent on an uncontrolled source of power;
    a plurality of deterministic assets consisting of at least one of a nuclear powered generation plant and a fuel burning generation plant, the plurality of deterministic assets comprising:
        a first subset of at least one deterministic asset of the plurality of deterministic assets having a first determinable response time to load changes; and
        a second subset of at least one remaining deterministic asset of the plurality of deterministic assets having a second determinable response time to load changes that is slower than the first determinable response time; and
    a controller communicatively coupled to said at least one volatile asset and said first subset, said controller configured to:
        receive current operating data from said at least one volatile asset;
        retrieve historical data from said at least one volatile asset;
        predict future fluctuations in a power output of said at least one volatile asset based on the received current operating data and the retrieved historical data, wherein the future fluctuations in the power output of said at least one volatile asset are further predicted for a time period defined by the slower second determinable response time, whereby the second subset is controlled during the time period and prior to occurrence of the predicted future fluctuations to facilitate compensation of the predicted future fluctuations; and
        operate at least said second subset in a real-time control mode wherein a current power output of at least said second subset is controlled during the time period in response to the predicted future fluctuations in the power output of said at least one volatile asset, such that the power output of said first subset plus the power output of said second subset plus the power output of said at least one volatile asset remains equal to a predetermined combined power output when the predicted future fluctuations occur.

2. A system in accordance with claim 1, wherein said at least one volatile asset comprises a wind turbine.

3. A system in accordance with claim 2, wherein the received data includes a location of said wind turbine, a current power output of said wind turbine, and a currently measured wind speed at said wind turbine.

4. A system in accordance with claim 1, wherein said at least one of said first subset and said second subset comprises a gas turbine.

5. A system in accordance with claim 1, wherein said controller is further configured to:

collect operating data for a power asset, wherein the power asset is one of said at least one volatile asset and said plurality of deterministic assets;
determine an operating mode of the power asset;
analyze historical data to determine an average state for assets previously operating in the operating mode;
analyze the historical data to identify a problem run for an asset previously operating in the operating mode; and
cause the operating data, determined average state, and identified problem run to be displayed to a human operator.

6. A system in accordance with claim 5, wherein said controller is further configured to:
store the collected operating data; and
generate updated historical data based on the stored operating data.

7. A system in accordance with claim 5, wherein said controller is further configured to cause a failure indicator to be displayed, the failure indicator identifying a failure that occurred as a result of the identified problem run.

8. A controller for managing multiple power assets, said controller comprising:
a memory device; and
a processor communicatively coupled to said memory device, said processor configured to:
receive current operating data from at least one volatile asset;
retrieve historical data from the at least one volatile asset, wherein the power generation capability of the at least one volatile asset is dependent on an uncontrolled source of power;
predict future fluctuations in a power output of the at least one volatile asset based on the received current operating data and the retrieved historical data, wherein the future fluctuations in the power output of the at least one volatile asset are further predicted for a time period defined by a slower of a first response time for a first subset of a plurality of deterministic assets and a second response time for a second subset of the plurality of deterministic assets, whereby at least the slower responding one of the first subset and the second subset is controlled during the time period and prior to occurrence of the predicted future fluctuations to facilitate compensation of the predicted future fluctuations; and
operate at least one of the first subset and the second subset in a real-time control mode wherein a power output of the at least one of the first subset and the second subset is controlled during the time period in response to the predicted future fluctuations in the power output of the at least one volatile asset, such that the power output of the first subset plus the power output of the second subset plus the power output of the at least one volatile asset remains equal to a predetermined combined power output when the predicted future fluctuations occur, and wherein the plurality of deterministic assets include at least one of a nuclear powered generation plant and a fuel burning generation plant.

9. A controller in accordance with claim 8, wherein to receive data from at least one volatile asset, said processor is configured to receive data from a wind turbine.

10. A controller in accordance with claim 9, wherein to receive data from a wind turbine, said processor is configured to receive a location of the wind turbine, a current power output of the wind turbine, and a currently measured wind speed at the wind turbine.

11. A controller in accordance with claim 8, wherein to control operation of at least one deterministic asset, said processor is configured to control operation of a gas turbine.

12. A controller in accordance with claim 8, wherein said processor is further configured to:
collect operating data for a power asset, wherein the power asset is one of the at least one volatile asset and at least one deterministic asset of the plurality of deterministic assets;
determine an operating mode of the power asset;
analyze historical data to determine an average state for assets previously operating in the operating mode;
analyze the historical data to identify a problem run for an asset previously operating in the operating mode; and
cause the operating data, determined average state, and identified problem run to be displayed on a presentation interface coupled to said processor.

13. A controller in accordance with claim 12, wherein said processor is further configured to:
cause the collected operating data to be stored in said memory device; and
generate updated historical data based on the stored operating data.

14. A controller in accordance with claim 12, wherein said processor is further configured to cause a failure indicator to be displayed on the presentation interface, the failure indicator identifying a failure that occurred as a result of the identified problem run.

15. A method for managing multiple power assets, said method comprising:
receiving, at a controller, current operating data from at least one volatile asset, wherein the power generation capability of the at least one volatile asset is dependent on an uncontrolled source of power;
retrieving historical data from the at least one volatile asset;
predicting, using the controller, future fluctuations in a power output of the at least one volatile asset based on the received current and the retrieved historical data, wherein the future fluctuations in the power output of the at least one volatile asset are further predicted for a time period defined by a slower of a first response time for a first subset of a plurality of deterministic assets and a second response time for a second subset of the plurality of deterministic assets, whereby at least the slower responding one of the first subset and the second subset is controlled during the time period and prior to occurrence of the predicted future fluctuations to facilitate compensation of the predicted future fluctuations; and
operating, by the controller, at least one of the first subset and the second subset in a real-time control mode wherein a power output of at least one of the first subset and the second subset is controlled in response to the predicted future fluctuations in the power output of the at least one volatile asset, such that the power output of the first subset plus the power output of the second subset plus the power output of the at least one volatile asset remains equal to a predetermined combined power output when the predicted future fluctuations occur, and wherein the first subset and the second subset include at least one of a nuclear powered generation plant and a fuel burning generation plant.

16. A method in accordance with claim 15, wherein receiving data from at least one volatile asset comprises receiving data from a wind turbine.

17. A method in accordance with claim 16, wherein receiving data from a wind turbine comprises receiving a location of the wind turbine, a current power output of the wind turbine, and a currently measured wind speed at the wind turbine.

18. A method in accordance with claim 15, wherein operating, by the controller, a first subset of a plurality of deterministic assets comprises controlling operation of a gas turbine.

19. A method in accordance with claim 15, further comprising:
- collecting operating data for a power asset, wherein the power asset is one of the at least one volatile asset and at least one deterministic asset of the plurality of deterministic assets;
- determining an operating mode of the power asset;
- analyzing historical data to determine an average state for assets previously operating in the operating mode;
- analyzing the historical data to identify a problem run for an asset previously operating in the operating mode; and
- causing the operating data, determined average state, and identified problem run to be displayed to a human operator.

20. A method in accordance with claim 19, further comprising:
- causing the collected operating data to be stored; and
- generating updated historical data based on the stored operating data.

* * * * *